United States Patent [19]

Watanabe et al.

[11] Patent Number: 5,024,255
[45] Date of Patent: * Jun. 18, 1991

[54] METHOD OF FILLING A LIQUID CRYSTAL DEVICE WITH FERROELECTRIC LIQUID CRYSTAL MATERIAL

[75] Inventors: Toshio Watanabe; Masahiko Sato; Akio Osabe, all of Atsugi; Hiroyuki Sakayori, Souka; Akira Mase, Atsugi, all of Japan

[73] Assignee: Semiconductor Energy Laboratory Co., Ltd., Kanagawa, Japan

[*] Notice: The portion of the term of this patent subsequent to May 8, 2007 has been disclaimed.

[21] Appl. No.: 222,636

[22] Filed: Jul. 21, 1988

[30] Foreign Application Priority Data

Jul. 27, 1987 [JP] Japan .................. 62-188442

[51] Int. Cl.$^5$ .......... G09F 9/00; G09F 1/13; G09F 1/00; B67D 5/37
[52] U.S. Cl. .................. 141/11; 141/82; 141/4; 141/5; 141/7; 141/59; 156/99
[58] Field of Search .............. 141/1, 4, 5, 7, 8, 9, 141/11, 12, 59, 65, 69, 71, 73, 80, 82; 156/99, 145, 148, 103–105

[56] References Cited

U.S. PATENT DOCUMENTS

| | | | |
|---|---|---|---|
| 3,701,368 | 10/1972 | Stern | 141/1 |
| 3,909,930 | 10/1975 | Gurtler | 156/145 X |
| 4,064,919 | 12/1977 | Stern et al. | 141/7 |
| 4,091,847 | 5/1978 | Sorkin | 141/7 |
| 4,098,301 | 7/1978 | Bloom et al. | 141/7 |
| 4,626,303 | 12/1986 | Ogura | 156/145 |
| 4,753,276 | 6/1988 | Inaba et al. | 141/7 |
| 4,922,972 | 5/1990 | Watanabe et al. | 141/4 |
| 4,922,974 | 5/1990 | Watanabe et al. | 141/4 |

FOREIGN PATENT DOCUMENTS

| | | | |
|---|---|---|---|
| 0007015 | 1/1977 | Japan | 141/7 |
| 0168627 | 12/1981 | Japan | 141/1 |
| 0168633 | 12/1981 | Japan | 141/1 |

Primary Examiner—Ernest G. Cusick
Attorney, Agent, or Firm—Sixbey, Friedman, Leedom & Ferguson

[57] ABSTRACT

An improved method of filling a liquid crystal device with a blended ferroelectric liquid crystal material is disclosed. The method includes the step of disposing the blended ferroelectric liquid crystal material in an inner space formed in the liquid crystal device, with the temperature of the blended liquid crystal being maintained during the disposing step at a temperature higher than the transition temperature of any constituent of the blended liquid crystal material such that the blended liquid crystal material is transformed in its isotropic phase.

1 Claim, 4 Drawing Sheets

F I G. 2
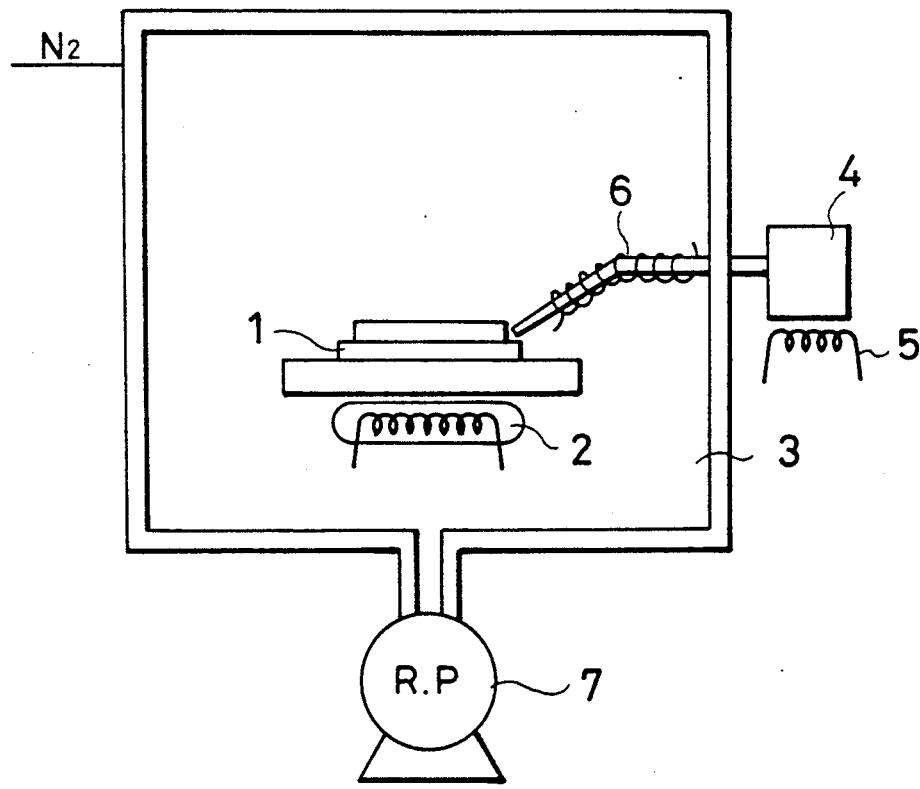

METHOD OF FILLING A LIQUID CRYSTAL DEVICE WITH FERROELECTRIC LIQUID CRYSTAL MATERIAL

BACKGROUND OF THE INVENTION

This invention relates to a method of filling a liquid crystal device with a ferroelectric liquid crystal material.

Vacuum filling method is a known method for filling the space between a pair of substrates of a liquid crystal device with a liquid crystal to manufacture a liquid crystal device. In this prior art method, the liquid crystal device is entered in a vacuum chamber at a vacuum together with the liquid crystal material, and then, after the inlet port of the device is caused to sink in the liquid crystal, the pressure is elevated so that the liquid crystal enters the liquid crystal device through the inlet port. One type of this method is described in Japanese application No. sho 60-175192.

However, there are several shortcomings associated with this method. The inlet port of the liquid crystal device is substantially narrow so that the pressure in the liquid crystal device can not be lowered rapidly. Because of this, the liquid crystal device is subjected to the differential pressure between the inside and the outside of the liquid crystal device when the vacuum chamber is evacuated, and therefore tend to be deformed due to the undesirable pressure.

To comply with the shortcoming, it is proposed to mate a pair of substrates firmly to bear the differential pressure and maintain the distance between substrates by making use of two or more types of spacers arranged therein. Nevertheless, in some instances the device may be destroyed due to a transient force of about 1 kg/cm$^2$ which arises during evacuation.

Furthermore, the filling process is generally carried out in a particular phase of liquid crystal. A ferroelectric liquid crystal exhibits its phase transition as the temperature varies, e.g. Cry phase ⟷ SmC phase ⟷ SmA phase ⟷ Iso phase. This phase transition is observed also with a blended liquid crystal. An Iso (isotropic) phase is most suitable for filling process since it evidences a low viscousity. An example of the method is described in Japanese Patent Application No. sho 60-175192.

However, when a blended liquid crystal material composed of several constituent liquid crystals is used, one liquid crystal constituent has a tendency to enter through in advance of another so that, when the space is filled, the liquid crystal material becomes nonuniform and has diverse composition different from the prescribed composition depending on the position. Having carefully investigated this phenomena, the inventors found that the transition temperature of the blended liquid crystal is not observed at a certain definitive level and a mixed phase seems to appear due to differential transition temperatures of the constituent liquid crystals. In other word, it may happen during filling process that one constituent liquid crystal is of Iso phase while another constituent liquid crystal remains in Smc phase. This nonuniformity makes it impossible to drive the liquid crystal material by common driving conditions throughout the device.

The filling of blended liquid crystal materials into the liquid crystal material has been carried out through a plurality of openings provided around the mated substrates of the device as shown in FIG. 1(A) for accelerating the filling. Because of differential viscosities of constituents, the liquid crystal material present at the dashed area 8 (FIG. 1(B)) where the flows of liquid crystal material entering through the openings meet has a different property than the liquid crystal material present at other areas. Orientation dispersion has been observed along the area 8. This nonuniform property of liquid crystal causes disparity of driving performance. In some cases, it may happen that the liquid crystal becomes incapable of displaying at certain areas because of the differential transition temperatures between that positions and the other positions.

SUMMARY OF THE INVENTION

It is therefore an object of the invention to provide a method of filling a liquid crystal device with ferroelectric liquid crystal.

It is another object of the invention to provide a method of filling a liquid crystal device with ferroelectric liquid crystal in which the yield of product is not lowered due to the process.

BRIEF DESCRIPTION OF THE DRAWINGS

FIG. 2 is a schematic view showing a method of filling a liquid crystal device with a liquid crystal in accordance with the present invention.

DETAILED DESCRIPTION OF THE PREFERRED EMBODIMENTS

Figure 1A:
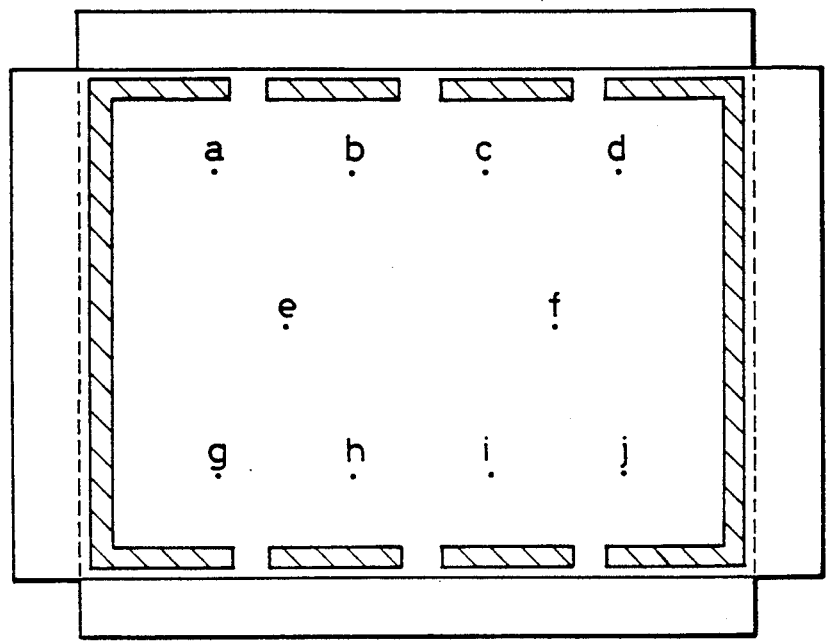
FIGS. 1(A) and 1(B) are explanatory views showing how a prior art liquid crystal device is filled with liquid crystal material.
Figure 1B:
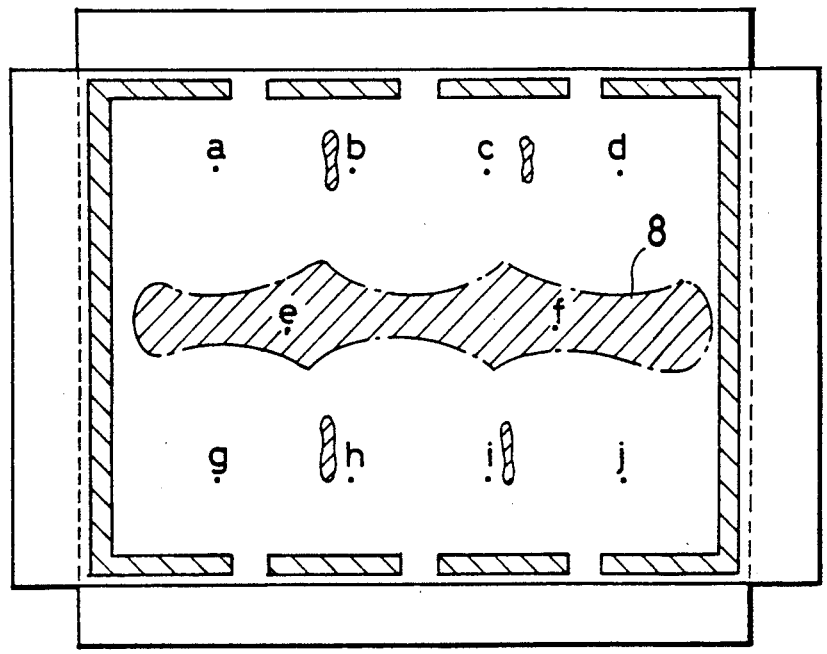

Referring to FIG. 2, a method of filling a liquid crystal device with a ferroelectric liquid crystal in accordance with the present invention is described. The liquid crystal device comprises a pair of glass substrates which are firmly mated in parallel and spaced a certain distance to produce a space there between. The liquid crystal is such that it is in a semectic phase at room temperature.

In FIG. 2, a liquid crystal device 1 is placed in a vacuum chamber 3 followed by evacuation by a vacuum pump 7 in order to maintain the pressure in the chamber at $1 \times 10^{-4}$ Torr or higher whereas the liquid crystal device 1 is heated by a heater 2. On the other hand, a liquid crystal accumulated in a dispenser 4 is heated by a heater 5 above the transition temperature so that the liquid crystal is maintained in the Iso phase. The liquid crystal is a blended liquid crystal composed of two or more constituent liquid crystals. An amount of the liquid crystal is poured to the inlet port of the liquid crystal device. In this process, the temperature of the liquid crystal is always maintained higher than the transition temperature of any constituent liquid crystal by the heaters 2, 4 and 6.

Then, nitrogen gas is introduced at 20SCCM to the inside of the vacuum chamber 3 to produce a differential pressure between the vacuum chamber and the inside space of the liquid crystal device to be filled with the liquid crystal material whereupon the liquid crystal in Iso phase is caused to fill the space in the device by virtue of the differential pressure. The pressure in the chamber is eventually elevated to an atmospheric pressure.

Figure 3:
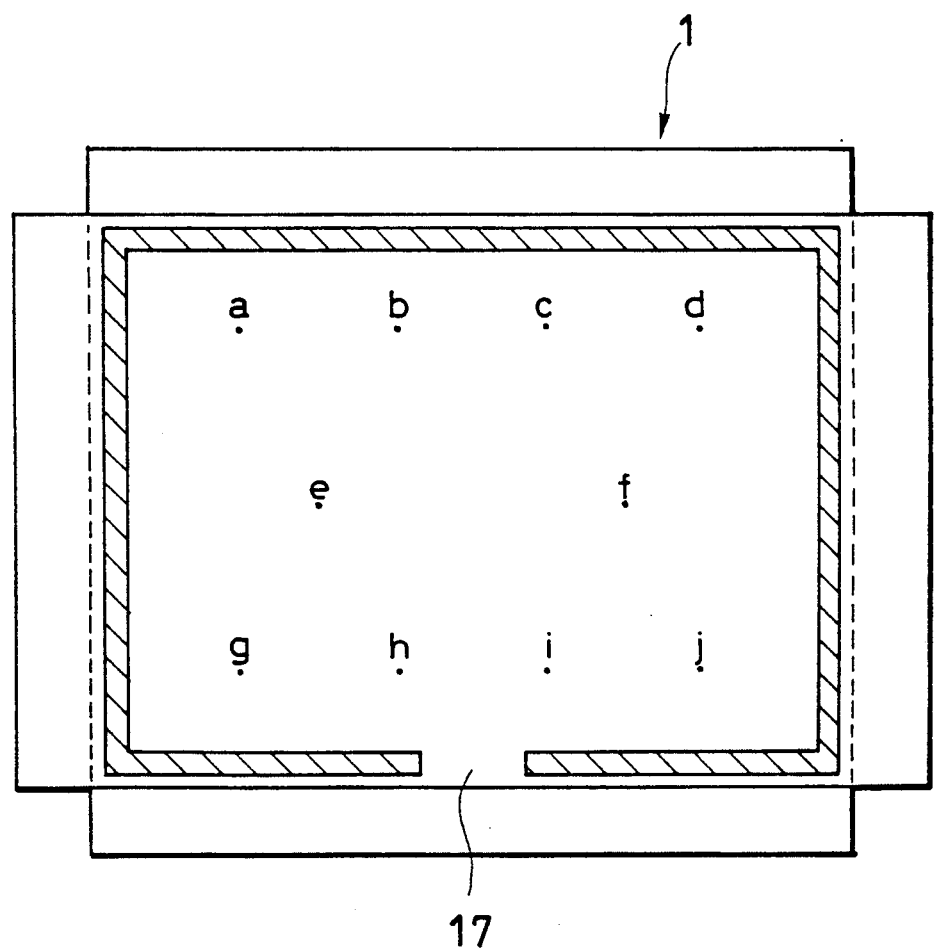
FIG. 3 is an explanatory view showing a liquid crystal device in accordance with the present invention.

The liquid crystal device 1 to be filled with the liquid crystal is prepared as illustrated in FIG. 3. The liquid crystal device is provided with a single relatively large aperture 17 as an inlet port through which the liquid crystal material is introduced into the device.

For reference, the compositions of liquid crystal materials sampled at various positions of the device prepared in accordance with the present invention and at the corresponding positions of the prior art device were examined. Four positions were selected near the aperture 17 at the same distance. In the opposite side, corresponding four positions were selected also at same distances. Two other positions were selected in the center position. The examination was implemented by liquid chromatography. The peak levels in regard to a certain constituent have been measured as below. The unit of the height of peaks is centimeter.

| Position | This Invention | Prior Art |
| --- | --- | --- |
| a | 7.0 | 7.3 |
| b | 8.0 | 7.1 |
| c | 7.3 | 9.6 |
| d | 7.5 | 5.8 |
| e | 7.4 | 10.0 |
| f | 7.2 | 5.5 |
| g | 7.6 | 6.9 |
| h | 7.2 | 7.9 |
| i | 7.5 | 8.4 |
| j | 7.1 | 7.7 |

As shown in the above data, it is noted that the constituent has been distributed uniformly through out the device in accordance with the invention. By contrast, in accordance with the prior art, the height has been dispersed and therefore the proportion of the constituent in the liquid crystal material was varied depending on the position.

Figure 4:
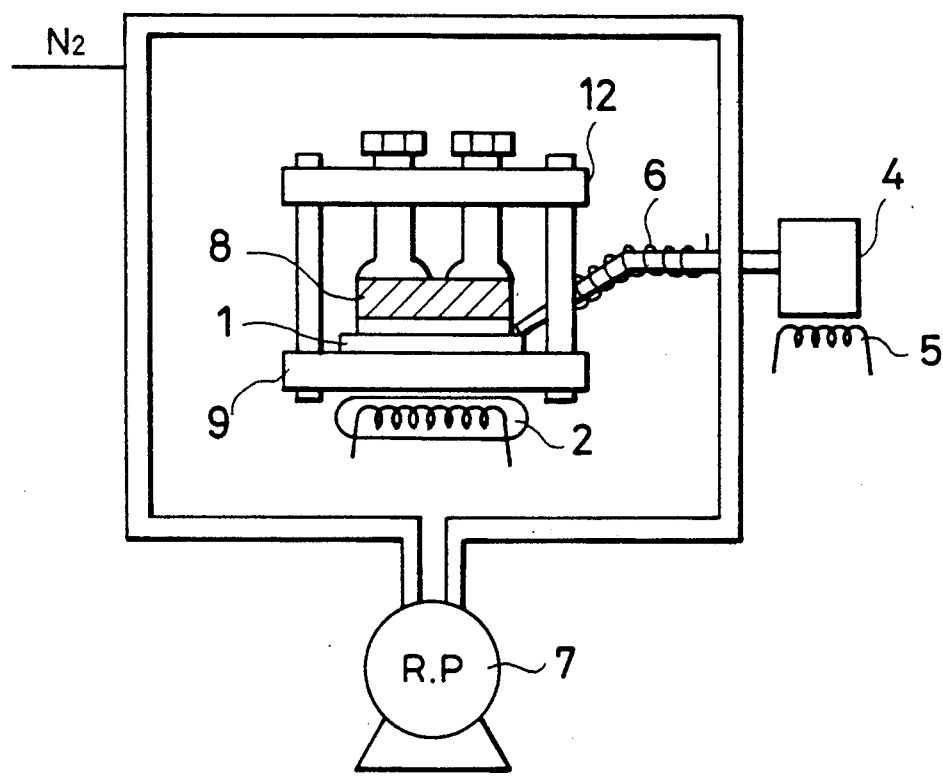
FIG. 4 is schematic view showing another method of filling a liquid crystal device with a liquid crystal in accordance with the present invention.

FIG. 4 is a schematic view showing a second embodiment of a method in accordance with the present invention.

In FIG. 4, like numbers are given to corresponding parts to the first embodiment and the redundant explanation is dispensed with. The liquid crystal device 1 comprising a pair of substrates with spacers inbetween is disposed between parallel plates 8 and 9 of a press 12. The plates have been precisely positioned in parallel with each other. During the filling of the liquid crystal, the liquid crystal device is pressed in the vertical direction by means of the parallel plates 8 and 9 at 1 Kg/cm$^2$. The pressure should be determined in accordance with the vacuum level, e.g. 0.5–5.0 Kg/cm$^2$.

While a description has been made for several embodiments, the presents invention should be limited only by the appended claims and should not be limited by the particular examples. For example, although the opening provided on the sealing member is only one two openings can be formed, one being for the entrance of liquid crystal and other for evacuating the inside air during filling step.

We claim:

1. A method of filling a liquid crystal device with a blended ferroelectric liquid crystal material comprising the step of disposing said blended ferroelectric liquid crystal material in an inner space formed in said liquid crystal device, wherein the temperature of said blended liquid crystal is maintained during the disposing step higher than the transition temperature of any constituents of said blended liquid crystal material so that the blended liquid crystal material is transformed in its isotropic phase.

* * * * *